United States Patent
Rakauskas

[11] Patent Number: 5,925,211
[45] Date of Patent: Jul. 20, 1999

[54] LOW PRESSURE MELAMINE/VENEER PANEL AND METHOD OF MAKING THE SAME

[75] Inventor: Michael E. Rakauskas, Oshkosh, Wis.

[73] Assignee: International Paper Company, Purchase, N.Y.

[21] Appl. No.: 08/844,734

[22] Filed: Apr. 21, 1997

[51] Int. Cl.$^6$ .................................................. B32B 31/20
[52] U.S. Cl. ........................... 156/306.9; 156/307.7; 428/503; 428/511
[58] Field of Search ................................ 156/228, 306.6, 156/306.9, 307.1, 307.3, 307.4, 307.5, 307.7, 331.1, 331.5, 331.8; 428/511, 503, 534, 535; 144/348, 352

[56] References Cited

U.S. PATENT DOCUMENTS

| | | | |
|---|---|---|---|
| 3,793,113 | 2/1974 | Pearson | 156/335 |
| 3,929,545 | 12/1975 | Van Dyck et al. | 156/220 |
| 3,933,755 | 1/1976 | Michaud et al. | 260/67.6 R |
| 4,012,548 | 3/1977 | Roberti | 428/106 |
| 4,083,744 | 4/1978 | Degens | 156/306 |
| 4,109,043 | 8/1978 | DeLapp | 428/206 |
| 4,263,073 | 4/1981 | Jaisle et al. | 156/90 |
| 4,552,792 | 11/1985 | Julian et al. | 428/40 |
| 4,652,477 | 3/1987 | Rindfleisch et al. | 428/40 |
| 4,822,440 | 4/1989 | Hsu et al. | 156/307.5 |
| 4,898,788 | 2/1990 | Minami et al. | 428/481 |
| 5,286,545 | 2/1994 | Simmons, Jr. | 428/192 |
| 5,425,986 | 6/1995 | Guyette | 156/307.4 |

OTHER PUBLICATIONS

*American National Standard for Hardwood and Decorative Plywood*, American National Standards Institute, New York, 1994, pp. 18–20.

*Kirk–Othmer Encyclopedia of Chemical Technology* (1995 ed.), vol. 14, pp. 1074–1090. TP9.E685 1992.

*Primary Examiner*—Michael W. Ball
*Assistant Examiner*—Michael A Tolin
*Attorney, Agent, or Firm*—Marshall, O'Toole, Gerstein, Murray & Borun

[57] ABSTRACT

A layered composite product for use as a floorboard, a door, a cabinet, a wall, etc. is disclosed. The product is a layered structure that includes a rigid substrate layer having two substantially planar sides, a resin-saturated sheet layer disposed on each of the substantially flat sides, and a veneer layer disposed on at least one of the sheet layers. Also provided is a method of making the aforementioned product, the method comprising the steps of forming the layered structure, and then compressing the structure in a pressing apparatus for a time sufficient to cure the resin at under heat and pressure.

31 Claims, 1 Drawing Sheet

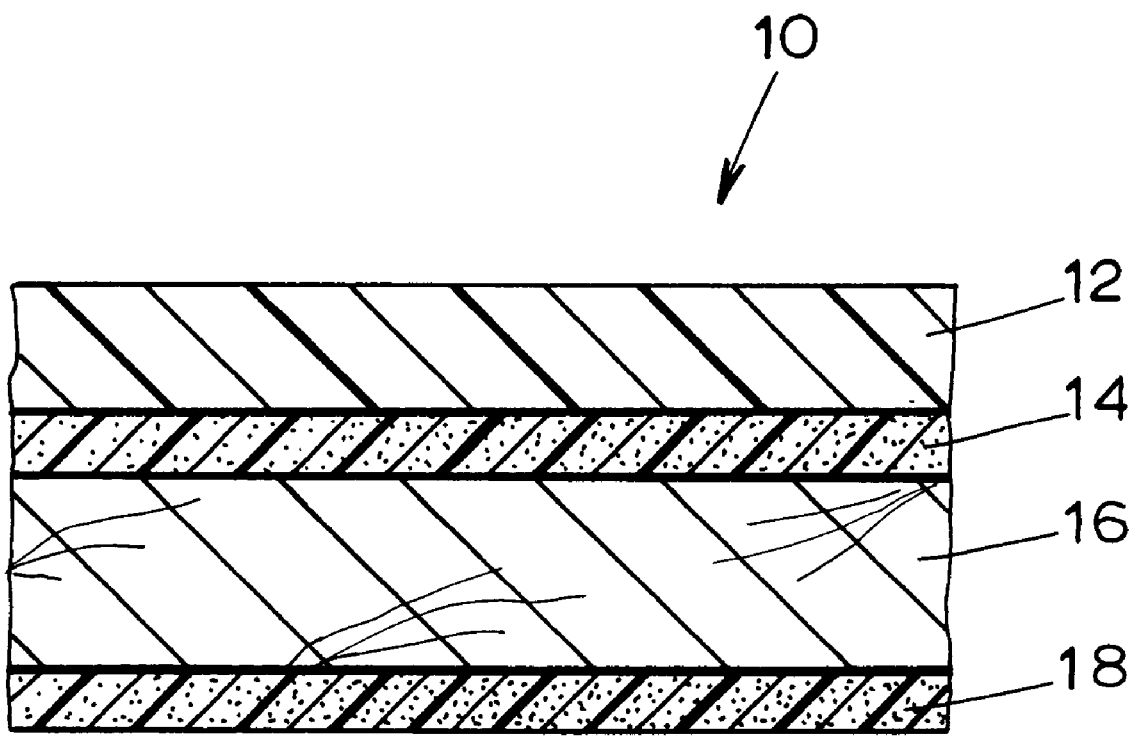

LOW PRESSURE MELAMINE/VENEER PANEL AND METHOD OF MAKING THE SAME

BACKGROUND OF THE INVENTION

1. Field of the Invention

The invention relates generally to pressure laminated wood products and methods of making the same. More specifically, the invention relates to low-pressure laminated wood products and a method of securing decorative veneers to core substrates using resin-saturated sheets.

2. Brief Description of Related Technology

Layered, composite wood structures having an inner core substrate and veneer layers affixed to one or more major planer surfaces of the inner core substrate are well-known in the art. Such composite wood structures exhibit the desirable characteristics of the veneer material while providing a cost savings over a solid structure made entirely of the veneer material. For example, a natural hardwood veneer, such as oak, may be secured to a less expensive substrate, such as high density fiberboard, to produce a composite panel article. The composite wood structures serve a variety of uses, such as floorboards, doors, cabinets, countertops, and walls, to name a few. Veneers used in forming the composite wood structures are selected from a wide variety of wood materials depending upon economic considerations and the end-use of the structure. Typical woods used as veneers in the past have included ash, birch, cherry, maple, oak, pine, poplar, and walnut.

Wood veneers may be secured to core substrates by lamination processes using resin binders in the form of resin-coated papers. Commonly used resins include thermosetting materials, such as melamine resins. Melamine resins, also known in the art as melamine/formaldehyde resins, typically exist in aqueous solution, although alcohols or other organics may also be used as solvents. A melamine-coated paper can be dried to remove water and/or solvent leaving a dry, solid state melamine-coated paper.

As described in Kirk-Othmer's *Encyclopedia of Chemical Technology*, Volume 14, pgs. 1074–91 (1995), a resin-coated paper may be placed between a veneer sheet and an inner core substrate to form a layered, composite wood structure. This layered structure is then heated in a compression molding press at a temperature of 130° C. (266° F.) to 150° C. (302° F.) for 20 minutes to 40 minutes. The initial heating causes the resin to melt and flow into the voids and pores of the core substrate and the veneer sheet. With a sufficiently long press cycle, the resin polymerizes and crosslinks into an intractable network structure (a thermoset) bonding the core substrate to the veneer. After heating, the structure is cooled while in the press under pressure, and thereafter may undergo finishing operations, such as trimming and/or sanding, to form the final product.

Thermosetting materials, such as melamine, have been used due to their superior resistance to discoloration when subjected to the conventional lamination temperatures and their exceptional bonding strength. Layered wood composite structures made by a conventional compression molding press processes, as described above, however, may experience excessive warpage toward the veneer side.

Wood veneer and substrate materials generally contain moisture. Changes in moisture content as a result of changes in atmospheric moisture conditions and wetting of the wood surface(s) by water generally tend to cause wood materials to warp or blister. The type of manufacturing process also may influence the moisture content of the formed wood product and thereby affect warpage. Thus, the original moisture content of the veneer and substrate, as well as the amount of water added by the aforementioned binder, must be maintained low to avoid warp and/or blistering of the wood materials. During heat curing and/or pressing of the wood materials, water evaporates from the wood materials. This evaporation may impart stresses in the wood materials, causing them to warp. The evaporation of additional moisture from the binder used to secure the various wood materials together may also contribute to wood warpage.

Balancing veneer or heavy duty backer paper have been used in the past to balance, or offset, the wood warping problem. In this case, where a veneer layer is placed on both faces of a substrate, any tendency of the wood materials to warp effectively cancel each other out. However, the use of this additional veneer as well as board production is unnecessarily expensive where a second veneer serves no cosmetic purpose. Furthermore, a second veneer is often not desired in certain applications, such as store display boxes (e.g., jewelery display cabinets).

Thus, it would be desirable to have a cost-efficient process for making a laminated wood structure wherein the amount of warpage is drastically reduced, if not eliminated altogether.

SUMMARY OF THE INVENTION

It is an object of the invention to overcome one or more of the problems described above.

According to the invention, a method of making a laminated composite article includes the steps of (a) forming a layered structure comprising a rigid substrate layer having two substantially planar sides, a resin-saturated paper layer disposed on each of the substantially planar sides, and a veneer layer disposed on at least one of the paper layers; and, (b) subjecting the structure to elevated temperature and pressure in a pressing apparatus for a press cycle time of about one minute or less.

The invention provides a laminated wood composite article comprising a rigid substrate layer having two substantially flat sides, one resin-saturated paper layer on-each of the substantially flat sides, and a veneer layer on at least one of the paper layers.

Other objects and advantages of the invention will be apparent to those skilled in the art from a review of the following detailed description, taken in conjunction with the drawing and the appended claims.

BRIEF DESCRIPTION OF THE DRAWING

The sole FIGURE is a partial, cross-sectional view of a laminated composite wood article according to the invention.

DETAILED DESCRIPTION OF THE INVENTION

According to the invention, a method of making a low pressure melamine/veneer panel is provided, the method generally including forming a composite wood structure including a rigid substrate layer having two substantially planar sides, a resin saturated paper layer disposed on each of the substantially planar sides of the substrate, and a veneer layer disposed on at least one of the paper layers. The composite wood structure is subjected to elevated heat and pressure in a pressing apparatus for a press cycle time of about one minute or less.

According to a preferred embodiment of the inventive method, there is initially provided a substrate having a top planar surface and a bottom planar surface. A surface of a resin-impregnated (or resin-saturated) low pressure laminate (hereafter "LPL") sheet is placed in contact with the top surface of the substrate, and another surface of the resin-impregnated sheet is placed in contact with a surface of a wood veneer sheet. A second resin-impregnated sheet is placed in contact with the bottom surface of the substrate, which is opposite (and parallel) to the top surface of the substrate.

Referring to the drawing, a partial, cross-sectional view of a laminated wood structure, generally designated 10, according to an embodiment of the invention is illustrated. The structure 10 includes a veneer sheet 12, a first resin-impregnated LPL sheet 14, a core substrate 16, and a second resin-impregnated LPL sheet 18. The structure 10 includes a core substrate 16 sandwiched between the first and second resin-impregnated LPL sheets 14 and 18, respectively, and a veneer sheet 12 overlying the first resin-impregnated LPL sheet 14. The layered structure 10 is laminated under heat and pressure according to the method described below to form a laminated composite wood article.

Suitable substrate materials for use in the laminated composite articles of the invention include various wood materials, such as particleboard and low-, medium-, and high-density fiberboard. Preferably, however, the substrate is a medium-density fiberboard having a density of about 45 pounds per cubic foot (lbs/ft$^3$) and 65 lbs/ft$^3$.

Generally, any sheet- or paper-like material can be used as the LPL layers of the inventive composite, so long as the material can be impregnated or saturated with a suitable resin composition. Suitable materials may be prepared from cellulosic fibers, such as creped or uncreped kraft paper and the like, and alpha-cellulose sheet material. These sheets are typically regenerated cellulose paper, or similar fibrous material. It is preferable, however, to use an alpha cellulose sheet material. Furthermore it is preferred to use an alpha cellulose sheet having a basis weight in the range of about 40 pounds per ream to about 100 pounds per ream (about 18 kilograms per ream to about 45 kilograms per ream).

The resin of the resin-impregnated LPL sheet comprises a melamine resin, and preferably comprises either (a) a melamine/urea blend and additives, or (b) about 98 wt. % melamine with trace concentrations of additives. A preferred melamine/urea blend includes one comprising about 60 wt. % melamine and about 40 wt. % urea based on the total weight of the resin composition. However, other blends of melamine and urea also can be used. Additives comprising the resin composition include one or more catalysts to control resin rate of cure, wetting agents, internal release agents, and plasticizers. Typically, the total concentration of additives comprising the resin composition is about 2 wt. % or less based on the total weight of the resin composition.

The impregnation of the LPL sheet generally is achieved by transforming the resin composition into a solution with a suitable organic solvent and/or water, and by applying the resultant solution to the sheet or by immersing the sheet into the resultant solution. In order to minimize formaldehyde emissions in subsequent heating and drying steps, it is preferable to saturate (as opposed to simply coat) the sheet with the resultant solution. After the sheet has been saturated with the resultant solution, the sheet is preferably dried at room temperature or under application of heat to effect the expulsion of the volatile organic component and/or water to the fullest extent possible. Some polymerization occurs during this volatilization step. Suitable ovens that can be used to accomplish this drying step are air flotation ovens.

By drying the sheet by the foregoing procedure a resin-impregnated (also referred hereafter as a "resin-saturated") sheet is formed, which contains the resin in a dry, solid state. The concentration of resin in the resin-impregnated sheet is preferably in the range of about 50 wt. % to about 65 wt. % based on the total weight of the resin-impregnated sheet. The pH of the resin saturating the LPL sheet is about 8.0 to about 9.5, and preferably is about 8.5 to about 9.0. The moisture content of the resin in the sheet is preferably about 6 wt. % to about 8 wt. % based on the weight of the resin-impregnated sheet, and more preferably is about 7 wt. % based on the weight of the resin-impregnated sheet.

Any wood-like material is suitable as a veneer material for use according to the invention. Such materials include softwood materials, man-made wood veneers, and hardwood materials, wood composite materials, and high pressure laminates, such as a composition of a phenolic resin-impregnated kraft sheet covered by a melamine decorative sheet. Suitable wood composite materials include softboard, medium density fiberboard, hardboard, particleboard, plywood, and waferboard. The moisture content of the veneer materials is preferably in the range of about 7 wt. % to about 10 wt. % based on the weight of the veneer, and more preferably should be between about 8 wt. % to about 9 wt. % based on the weight of the veneer.

The layered structure is subjected to heat and pressure in a pressing apparatus including a first platen and a second platen. Each platen, optionally, may contain caul plates which are often used to impart a pattern to the wood or resin-impregnated sheet. Furthermore, the pressed structure also has a reduced tendency to adhere to the caul plates compared to the platens.

The layered structure is arranged in the pressing apparatus such that during pressing the first platen is in thermal contact with the veneer layer. The first platen preferably has a temperature of about 350° F. (177° C.) to about 405° F. (207° C.), and preferably has a temperature of about 375° F. (190° C.) to about 385° F. (196° C.). The second platen preferably has a temperature of about 320° F. (160° C.) to about 350° F. (177° C.), and preferably has a temperature of about 335° F. (168° C.) to about 340° F. (171° C.). The first and second platens preferably compress the layered wood structure at a pressure of about 325 psi to about 425 psi, more preferably about 350 psi to about 380 psi, for a pressing period sufficient to cure the resin at the aforementioned temperatures and pressures. Preferably, the pressing period is about 60 seconds or less, more preferably about 50 seconds or less, and most preferably about 30 seconds to about 40 seconds. The foregoing press cycle conditions of time, temperature, and pressure, allow the resin to sufficiently cure and form strong bonds between (a) the LPL sheet and the substrate and (b) between the LPL sheet and the veneer.

An important feature of the invention is the simultaneous lamination of the resin-impregnated LPL sheets to both top and bottom surfaces of the substrate material. This simultaneous lamination ensures minimal warpage of the substrate material and further ensures minimal water penetration into the substrate. The use of a resin-impregnated LPL sheets according to the invention also substantially prevents the evaporation of water from the wood itself, thereby minimizing wood warpage.

It has been found that the rate of resin cure also serves to control the occurrence of wood warpage. Thus, press temperatures and catalyst concentrations in the resin help finetune the elimination of wood warpage. For example, the higher the press temperature, the higher the tendency of the wood to warp. Therefore, press temperatures (for each of the first platen and second platen) are carefully selected to account for any tendencies of the wood materials to experience warpage based on the catalyst concentration. The tendency of the wood to warp toward the veneer side is offset by the catalyst concentration of the resin in the bottom LPL sheet as well as the temperature of the platen in thermal contact with the LPL sheet.

EXAMPLE

A 1/32 inch (0.079 cm) maple veneer having a moisture content of about 7 wt. % was laminated to a first major planar surface an 11/16 inch (1.75 cm) thick industrial grade particleboard. One 67 pounds per ream (30.4 kilograms per ream) resin-saturated white paper (alpha cellulose), having a resin content of about 62 wt. % resin content and about 7.5 wt. % organics content, was placed between the veneer and the first major planar surface of the particleboard. A second, equivalent resin-saturated white paper was place on a second major planar surface of the particleboard. Thus, the layered wood structure has a configuration as shown in the sole drawing figure.

The layered wood structure is placed in a single-opening, hot oil heated pressing apparatus having a first (top) platen, a caul plate affixed to the first platen, and a second (bottom) platen, wherein the caul plate of the first platen is in thermal contact with the veneer layer, and the second platten is in thermal contact with the second resin-saturated white paper. The apparatus subjected the layered wood structure heat and pressure. The first (top) platen (and caul plate) was maintained at a temperature of about 350° F., the second (bottom) platen was maintained at a temperature of about 320° F., at a pressure of about 380 psi for a press cycle time of about 55 seconds. The resultant panels were relatively flat and passed an ANSI Hardwood Plywood & Veneer Association (HPVA) Type 1 glue bond line test.

The foregoing detailed description is provided for clearness of understanding only, and no unnecessary limitations should be understood therefrom, as modifications within the scope of the invention will be apparent to persons of ordinary skill in the art.

I claim:

1. A method of producing a laminated composite article, said method consisting essentially of the steps of:
   (a) forming a layered structure comprising a rigid substrate layer having two substantially flat sides, a resin-saturated sheet layer disposed on each of said sides, and a veneer layer disposed on only one of said sheet layers; and,
   (b) subjecting said structure to elevated temperature and pressure in a pressing apparatus for a time sufficient to cure said resin at said temperature and pressure.

2. The method of claim 1, wherein said pressing apparatus comprises a first platen and a second platen, said first platen having a temperature of about 350° F. to about 405° F., and said second platen having a temperature of about 320° F. to about 350° F.

3. The method of claim 1, wherein said pressing apparatus subjects the structure of step (a) to a pressure of about 325 psi to about 425 psi.

4. The method of claim 1, wherein said time is about one minute or less.

5. The method of claim 1, wherein said time is about 30 seconds to about 40 seconds.

6. The method of claim 1, wherein said resin of said resin-saturated sheet is a material comprising melamine.

7. The method of claim 6, wherein said resin of said resin-saturated sheet is a material comprising about 98 wt. % melamine.

8. The method of claim 6, wherein said resin of said resin-saturated sheet is a material comprising a melamine/urea blend.

9. The method of claim 8, wherein said resin of said resin-saturated sheet is a material comprising about 60 wt. % of melamine and about 40 wt. % of urea.

10. The method of claim 6, wherein said resin comprises about 45 wt. % to about 65 wt. % of the resin-saturated sheet.

11. The method of claim 1, wherein said sheet of said resin-saturated sheet is an alpha cellulose sheet having a basis weight of about 40 pounds per ream to about 100 pounds per ream.

12. The method of claim 1, wherein said rigid substrate layer is a material selected from the group consisting of particleboard, low-density fiberboard, medium-density fiberboard, and high-density fiberboard.

13. The method of claim 1, wherein said veneer layer comprises a wood material having a moisture content of about 7 wt. % to about 10 wt. % based on the weight of the veneer.

14. A method of producing a composite article, comprising the steps of:
   (a) providing a rigid substrate layer having two substantially flat sides;
   (b) providing, on each of said sides of the substrate layer, a sheet layer that is substantially saturated with a thermosetting resin;
   (c) providing, on only one of said sheet layers, a veneer layer to form a lavered structure consisting essentially of said substrate layer, said sheet layers and said veneer layer;
   (d) providing the layered structure of step (c) in a pressing apparatus; and
   (e) subjecting the layered structure of step (d) to elevated temperature and pressure in said pressing apparatus for a period sufficient to cure said resin at said temperature and pressure.

15. The method of claim 14, wherein:
   the product of step (c) is provided in a pressing apparatus including a first platen and a second platen; and,
   in step (e) said first platen has an elevated temperature in the range of about 350° F. to about 405° F., and said second platen has an elevated temperature in the range of about 320° F. to about 350° F.

16. A method of producing a laminated composite article, said method comprising the steps of:
   (a) forming a layered structure comprising a rigid substrate layer having two substantially flat sides, a resin-saturated sheet layer disposed on each of said sides, and a veneer layer disposed on at least one of said sheet layers; and,
   (b) subjecting said structure to elevated temperature and pressure in a pressing apparatus for a time sufficient to cure said resin at said temperature and pressure, said pressing apparatus comprising a first platen and a second platen, said first platen operating at a temperature different from an operating temperature of said second platen.

17. The method of claim 16, wherein said operating temperature of said first platen is in a range of about 350° F.

to about 405° F., and said operating temperature of said second platen is in a range of about 320° F. to about 350° F.

18. The method of claim 16, wherein said pressing apparatus subjects the structure of step (a) to a pressure of about 325 psi to about 425 psi.

19. The method of claim 16, wherein said time is about one minute or less.

20. The method of claim 16, wherein said time is about 30 seconds to about 40 seconds.

21. The method of claim 16, wherein said resin of said resin-saturated sheet is a material comprising melamine.

22. The method of claim 21, wherein said resin of said resin-saturated sheet is a material comprising about 98 wt. % melamine.

23. The method of claim 21, wherein said resin of said resin-saturated sheet is a material comprising a melamine/urea blend.

24. The method of claim 23, wherein said resin of said resin-saturated sheet is a material comprising about 60 wt. % of melamine and about 40 wt. % of urea.

25. The method of claim 21, wherein said resin comprises about 45 wt. % to about 65 wt. % of the resin-saturated sheet.

26. The method of claim 16, wherein said sheet of said resin-saturated sheet is an alpha cellulose sheet having a basis weight of about 40 pounds per ream to about 100 pounds per ream.

27. The method of claim 16, wherein said rigid substrate layer is a material selected from the group consisting of particleboard, low-density fiberboard, medium-density fiberboard, and high-density fiberboard.

28. The method of claim 16, wherein said veneer layer comprises a wood material having a moisture content of about 7 wt. % to about 10 wt. % based on the weight of the veneer.

29. The method of claim 16, wherein said veneer layer is disposed on only one of said sheet layers.

30. A method of producing a composite article, comprising the steps of:
(a) providing a rigid substrate layer having two substantially flat sides;
(b) providing, on each of said sides of the substrate layer, a sheet layer that is substantially saturated with a thermosetting resin;
(c) providing, on at least one of said sheet layers, a veneer layer;
(d) providing the product of step (c) in a pressing apparatus; and
(e) subjecting the product of step (d) to elevated heat and pressure in said pressing apparatus for a period sufficient to cure said resin at said temperature and pressure, said pressing apparatus comprising a first platen and a second platen, said first platen operating at a temperature different from an operating temperature of said second platen.

31. The method of claim 30, wherein:
in step (e) said operating temperature of said first platen is in a range of about 350° F. to about 405° F., and said operating temperature of said second platen is in a range of about 320° F. to about 350° F.

* * * * *